United States Patent
Steele, III et al.

(10) Patent No.: US 12,165,112 B2
(45) Date of Patent: Dec. 10, 2024

(54) SYSTEM AND METHOD FOR PROVIDING A SEAMLESS VEHICLE CARE AT A VEHICLE CARE SITE

(71) Applicant: Quick Quack Car Wash Holdings, LLC, Roseville, CA (US)

(72) Inventors: Joseph Allen Steele, III, Plumas Lake, CA (US); Josh David Schumacher, Sacramento, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/196,205

(22) Filed: May 11, 2023

(65) Prior Publication Data
US 2024/0378570 A1 Nov. 14, 2024

(51) Int. Cl.
*G06Q 10/20* (2023.01)
*G06Q 20/40* (2012.01)
*G07F 17/00* (2006.01)
*H04L 9/40* (2022.01)

(52) U.S. Cl.
CPC .......... *G06Q 10/20* (2013.01); *G06Q 20/401* (2013.01); *G07F 17/00* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 2006/0180647 A1* | 8/2006 | Hansen | G07F 17/20 235/375 |
| 2009/0057401 A1* | 3/2009 | Brott | G06Q 20/28 235/382 |
| 2020/0226584 A1* | 7/2020 | Nawoj | G06Q 20/127 |
| 2021/0357893 A1 | 11/2021 | Kang | |
| 2022/0318233 A1 | 10/2022 | Martinez | |
| 2022/0366743 A1* | 11/2022 | Dunbar | G06Q 50/40 |
| 2023/0034169 A1 | 2/2023 | Ferenczi | |
| 2023/0045546 A1 | 2/2023 | Kim | |
| 2023/0249653 A1* | 8/2023 | Stoel | G07F 17/0014 705/1.1 |

* cited by examiner

Primary Examiner — Jamie R Kucab
(74) Attorney, Agent, or Firm — Caldwell Intellectual Property Law

(57) ABSTRACT

A system for providing a seamless vehicle care at a vehicle care site, the system vehicle care devices, edge devices operatively connected to vehicle care devices, and a control module connected to edge devices configured to receive a user input containing a vehicle care command specify a vehicle care device identifier associated with a vehicle care device and a user authentication datum, validate the vehicle care command based on the user authentication datum using a validation module connected to a data store, generate a validation datum according to the validation of the vehicle care command, wherein generating the validation datum includes identifying an edge based on the vehicle care device identifier, and transmit the validation datum to the edge device configured to active the vehicle care device as a function of the validation datum.

14 Claims, 7 Drawing Sheets

SYSTEM AND METHOD FOR PROVIDING A SEAMLESS VEHICLE CARE AT A VEHICLE CARE SITE

FIELD OF THE INVENTION

The present invention generally relates to the field of vehicle care apparatuses. In particular, the present invention is directed to system and method for providing a seamless vehicle care at a vehicle care site.

BACKGROUND

In recent years, the vehicle care industry has seen a significant increase in demand for seamless vehicle care services. Traditional vehicle care services, such as car washes, vacuuming, and other maintenance tasks, not only operate in a one-size-fits-all manner, but also follow cumbersome procedures that often failing to meet the expectations and/or unique requirements of each user and/or their respective vehicles. Vehicle care devices installed at the vehicle care site are also difficult to use and require manual activation.

SUMMARY OF THE DISCLOSURE

In an aspect, a system for providing a seamless vehicle care at a vehicle care site is described. The system includes a plurality of vehicle care devices, a plurality of edge devices operatively connected to the plurality of vehicle care devices, and a control module communicatively connected to the plurality of edge devices, wherein the control module is configured to receive a user input from a user using a user device, wherein the user input includes a vehicle care command, wherein the vehicle care command contains at least a vehicle care device identifier associated with at least a vehicle care device of the plurality of vehicle care devices, and at least a user authentication datum associated with the user, validate the vehicle care command as a function of the at least a user authentication datum using a validation module connected to a data store, wherein validating the token includes verifying the at least a vehicle care device identifier against a plurality of vehicle care device data stored in the data store and verifying the at least a user authentication datum against a plurality of user profiles stored in the data store, generate a validation datum as a function of the validation of the vehicle care command, wherein generating the validation datum includes identifying at least an edge device from the plurality of edge devices as a function of the verified at least a vehicle care device identifier, and transmit the validation datum to the at least an edge device, wherein the at least an edge device is configured to active the at least a vehicle care device as a function of the validation datum.

In another aspect, A method for providing a seamless vehicle care at a vehicle care site, wherein the method includes receiving, by a control module communicatively connected to a plurality of edge devices operatively connected to a plurality of vehicle care devices, a user input from a user using a user device, wherein the user input includes a vehicle care command, wherein the vehicle care command includes at least a vehicle care device identifier associated with at least a vehicle care device of the plurality of vehicle care devices and at least a user authentication datum associated with the user, validating, by the control module, the vehicle care command as a function of the at least a user authentication datum using a validation module connected to a data store, wherein validating the token includes verifying the at least a vehicle care device identifier against a plurality of vehicle care device data stored in the data store and verifying the at least a user authentication datum against a plurality of user profiles stored in the data store, generating, by the control module, a validation datum as a function of the validation of the vehicle care command, wherein generating the validation datum includes identifying at least an edge device from the plurality of edge devices as a function of the verified at least a vehicle care device identifier, and transmitting, by the control module, the validation datum to the at least an edge device, wherein the at least an edge device is configured to active the at least a vehicle care device as a function of the validation datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
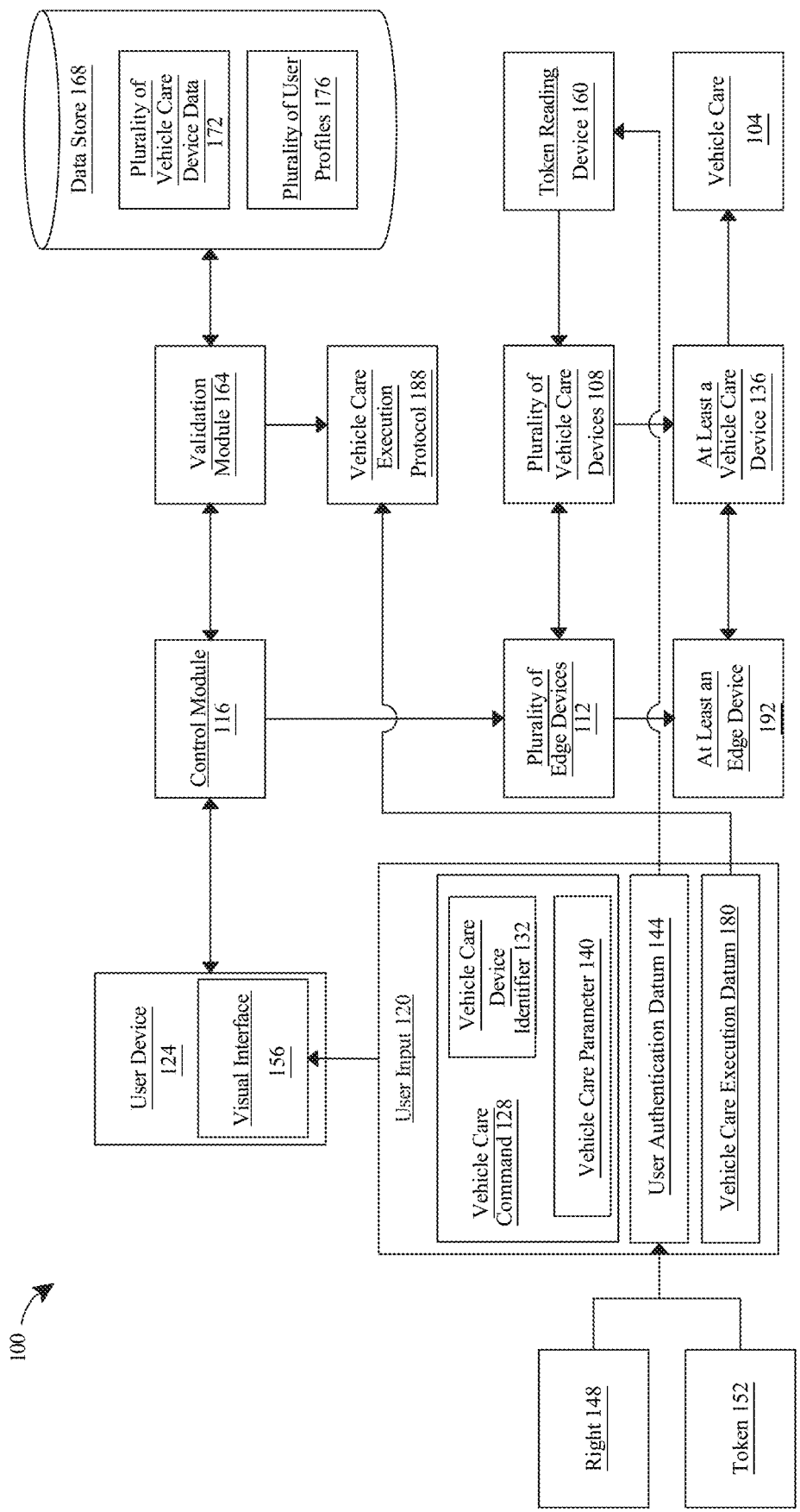
FIG. 1 is a diagram of an exemplary embodiment of a system for providing a seamless vehicle care at a vehicle care site.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for providing a seamless vehicle care at a vehicle care site. In an embodiment, system includes a control module designed to operate a plurality of vehicle care devices through a plurality of edge devices operatively connected to the plurality of vehicle care devices. The control module is configured to receive a user input from a user using a user device, wherein the user input includes a vehicle care command containing at least a vehicle care device identifier associated with at least a vehicle care device of the plurality of vehicle care devices and at least a user authentication datum associated with the user.

Aspects of the present disclosure allow for user credential verification and service activation. This is so, at least in part, because the control module is configured to validate the vehicle care command as a function of the at least a user authentication datum using a validation module connected to a data store, wherein validating the token includes verifying the at least a vehicle care device identifier against a plurality of vehicle care device data stored in the data store and verifying the at least a user authentication datum against a plurality of user profiles stored in the data store. In an embodiment, the at least a vehicle care device may include a token reading device configured to transmit the at least a user authentication datum to at least an edge device of the plurality of edge devices connected to the at least a vehicle care device by scanning a token within the user authentication datum, wherein the token may include a QR code.

Aspects of the present disclosure also allows for generating a validation datum as a function of the validation of the vehicle care command. In an embodiment, the control module is configured to identify at least an edge device from the plurality of edge devices as a function of the verified at least a vehicle care device identifier during the generation of the validation datum. In another embodiment, generating the validation datum may include executing a vehicle care execution protocol as a function of the validation of a vehicle care execution datum within the user input.

Aspects of the present disclosure can be used to activate the at least a vehicle care device as a function of the validation datum. This is so, at least in part, because control module is configured to transmit the validation datum to the at least an edge device, wherein the at least an edge device identified based on the verified at least a vehicle care device identifier. Exemplary embodiments illustrating aspects of the present disclosure are described below in the context of several specific examples.

In an embodiment, apparatus and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, El Gamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)- based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or El Gamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of a system 100 for providing a seamless vehicle care 104 at a vehicle care site is illustrated. As used in this disclosure, a "vehicle care" is any activity, service, or feature that may be offered at a vehicle service site or in association with any vehicle services. Vehicle may include, without limitation, car, truck, buses, motorcycles, boats, airplane, and the like. A "vehicle care site," for the purpose of this disclosure, is a location or establishment that offers vehicle care 104. In a non-limiting example, vehicle service site may include a car wash site. Vehicle care 104 may include, without limitation, a car washing service, a car vacuuming service. Activity offered at vehicle service site may include purchasing snacks or vehicle related products, manually operating one or more devices installed at vehicle service site such as, without limitation, plurality of vehicle care devices as described in further detail below, accessing utilities at vehicle service site (e.g., restrooms or other compartments/areas), and the like. In another non-limiting example, vehicle care 104 may further include vehicle maintenance services such as, oil change, tire rotation, brake inspection, air filter replacement, battery service, cooling system flush, transmission service, timing belt replacement, spark plug replacement, and the like at a vehicle service site such as an independent auto repair shop.

With continued reference to FIG. 1, system 100 includes a plurality of vehicle care devices 108. As used in this disclosure, "vehicle care devices" are a broad category of equipment, tools, or otherwise machines used to perform vehicle care 104 as described above. In some cases, plurality of vehicle care devices 108 may be designed to help maintain the appearance, performance, and/or longevity of vehicles by addressing various aspects of vehicle care 104 such as exterior cleaning, interior cleaning, maintenance tasks, and the like. In a non-limiting embodiment, plurality of vehicle care devices 108 may include a car wash equipment, wherein the car wash equipment is a device that are specifically designed to clean the exterior of a vehicle; for instance, and without limitation, car wash equipment may include an automated car wash system, a pressure washers, a foam applicator, and/or the like. In another non-limiting embodiment, plurality of vehicle care devices 108 may include a vacuum machine, wherein the vacuum machine is an equipment used for cleaning the interior of a vehicle; for instance, and without limitation, vacuum machine may include a self-service vacuum machine, a commercial-grade vacuum cleaner designed for automotive use, and/or the like. In another non-limiting embodiment, plurality of vehicle care devices 108 may include a vending machine, wherein the vending machine is a machine that dispense various products; for instance, vending machine may be configured to dispense vehicle care products such as air fresheners, cleaning supplies, detailing tools, and the like. Such vending machine may allow users to conveniently purchase and apply these products to their vehicles. Additionally, or alternatively, and still referring to FIG. 1, plurality of vehicle care devices 108 may include any device that support and/or facilitate vehicle care 104, such as, without limitation, a plurality of image capturing devices configured to capture a plurality of vehicle images as disclosed in U.S. patent application Ser. No. 18/195,537, filed on May 10, 2023, entitled "APPARATUS AND METHOD FOR AUTOMATIC LICENSE PLATE RECOGNITION OF A VEHICLE," which is incorporated by reference herein in its entirety. Other exemplary embodiments of vehicle care devices may include, without limitation, tire inflation device, fluid dispensing machine, diagnostic and maintenance tools (e.g., code readers, battery testers, tire pressure monitoring systems, etc.,) and the like.

With continued reference to FIG. 1, system 100 includes a plurality of edge devices 112 operatively connected to the plurality of vehicle care devices 108. In some cases, each edge device of the plurality of edge devices 112 may be operatively connected to one or more vehicle care devices 108. As used in this disclosure, an "edge device" is a component that is located closer to the source of data generation and/or collection and end-users within a digital environment. "Operatively connected," as described herein, means connected by way of a connection, attachment, or linkage between two or more components or devices which allows for cooperative operation to achieve a specific purpose. In a non-limiting example, operative connection may allow plurality of edge devices 112 and plurality of vehicle care devices 108 to work together, exchange information, and control each other's functions in a coordinated manner. In an embodiment, plurality of edge devices 112 may process and analyze data (e.g., user input as described below) locally, instead of sending the data to a centralized data center or cloud for processing (e.g., control module as described below). In some cases, edge device may include a piece of hardware; for instance, and without limitation, each edge device of plurality of edge devices 112 may include, without limitation, a plurality of servers. Each edge device of plurality of edge devices 112 may include any computing device as described in this disclosure. In a non-limiting example, each edge device of plurality of edge devices 112 may be equipped with one or more processors, memory, and storage to process and analyze data locally. Plurality of edge devices 112 may be placed near the data sources (e.g., sensors, IoT devices, end-users, and the like) such as, without limitation, plurality of vehicle care devices 108 listed above, to reduce the physical distance data must travel, resulting in a lower latency and faster response times. Plurality of edge devices 112 may be connected to other devices and/or components within system 100 (e.g., vehicle care devices, other edge computing devices, control module, and/or the like) through various communication protocols, such as, without limitation, Wi-Fi, Bluetooth, Radio Frequency, Ethernet, cellular networks, and/or the like. Alternatively, edge device may include a piece of software. In a non-limiting example, each edge device of plurality of edge devices 112 may be implemented as a middleware in the form of software running on a hardware platform (i.e., server). As used in this disclosure, a "middleware" is a layer of software that acts as an intermediary between various applications, devices, components, or otherwise services. In an embodiment, middleware may enable communication between plurality of vehicle device 102 and control module as described below. Plurality of edge devices 112 may enable a real-time data processing, reduce latency, and minimize data transmission costs within system 100 by processing and analyzing data as it is generated.

Still referring to FIG. 1, a "digital environment," for the purpose of this disclosure is an integrated communications environment where digital devices communicate and manage data and interactions within the digital environment. Digital device may be any electronic device as described in this disclosure that uses a digital signal instead of an analog signal for processing and transmitting data such as, without limitation, plurality of vehicle devices 108, plurality of edge devices 112, control module, user device, any computing device, and the like. In an embodiment, any processing step described in this disclosure may be performed in digital environment. System 100 may be connected to the digital environment through a network. Network may include a computer network containing one or more data connections between one or more network nodes. In a non-limiting example, each edge device of plurality of edge devices 112 may include a plurality of network nodes. In some embodiments, network may include, without limitation, personal area network (PAN), local area network (LAN), mobile ad hoc network (MANET), metropolitan area network (MAN), wide area network (WAN), cellular network, global area network (GAN), space network, and the like. In some embodiments, data connections between one or more network nodes may include one or more wire connection between a first network node and a second network node. In other embodiments, data connections between one or more network nodes may include one or more wireless connections between a first network node and a second network node. As used in this disclosure, a "network node" is a node as a redistribution point in network. In an embodiment, network node may include a communication endpoint. In a non-limiting example, plurality of digital devices may transmit one or more network packet (containing packet header, payload, signature, transferred data, and/or the like) between each other and/or networks through one or more data connections, wherein the network packet is a unit of data that transfer over network. Additionally, or alternatively, network may include an open systems interconnection (OSI) model, wherein the OSI model may further organize a plurality of functions of data communications by segregating the plurality of functions into a plurality of layers (e.g., application layer, presentation layer, session layer, transport layer, network layer, data link layer, physical layer, and the like).

Still referring to FIG. 1, in an embodiment, network may include, participate in, and/or be incorporated in a network topology. A "network topology" as used in this disclosure is an arrangement of elements of a communication network. In some embodiments, network may include, but is not limited to, a star network, tree network, and/or a mesh network. A "mesh network" as used in this disclosure is a local network topology in which the infrastructure nodes connect directly, dynamically, and non-hierarchically to as many other nodes as possible. Network nodes may be configured to communicate in a partial mesh network. A partial mesh network may include a communication system in which some nodes may be connected directly to one another while other nodes may need to connect to at least another node to reach a third node. In some embodiments, network may be configured to communicate in a full mesh network. A full mesh network may include a communication system in which every network node in network may communicate directly to one another. In some embodiments, network may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no crosstalk between the two layers which advantageously provides a redundancy and safeguard in the event of a disruption in the operation of one of the layers. A layer may be an abstraction which is not tangible.

Still referring to FIG. 1, in some cases, each edge device of plurality of edge devices 112 may include one or more digital devices related to one or more networks as described above. In a non-limiting example, digital devices may include a network bridge, wherein the network bridge is a computer networking device that aggregates networks from a plurality of networks. In another non-limiting example, digital devices may include a network switch, wherein the network switch is a computer networking device responsible for connecting one or more digital devices on network within digital environment. Network switch may connect one or more digital devices on network using packet switching at data link layer of open systems interconnection model to receive and forward data in between connected digital devices. In other non-limiting example, digital devices may include a router, wherein the router is a device configured to forward network packet between one or more networks. In an embodiment, router may forward network packet from one network to another by processing the addressing or routing information included in packet header. Router may be connected to at least an access point (AP), wherein the at least an access point is a digital device that allows other digital devices to connect to the network such as, without limitation, network node, communication endpoint, and the like thereof. Persons skilled in the art, upon reading the entirety of this disclosure, will be aware of various digital devices related to one or more networks incorporated by plurality of edge devices 112 for purposes described herein.

With continued reference to FIG. 1, system 100 includes a control module 116 communicatively connected to plurality of edge devices 112. Control module may include a processor. Processor may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor may include a single computing device operating independently, or may include two or more computing device operating in concert, in parallel, sequentially or the like; two or more computing devices may be included together in a single computing device or in two or more computing devices. Processor may interface or communicate with one or more additional devices as described below in further detail via a network interface device. Network interface device may be utilized for connecting processor to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor may include but is not limited to, for example, a computing device or cluster of computing devices in a first location and a second computing device or cluster of computing devices in a second location. Processor may include one or more computing devices dedicated to data storage, security, distribution of traffic for load balancing, and the like. Processor may distribute one or more computing tasks as described below across a plurality of computing devices of computing device, which may operate in parallel, in series, redundantly, or in any other manner used for distribution of tasks or memory between computing devices. Processor may be implemented using a "shared nothing" architecture in which data is cached at the worker, in an embodiment, this may enable scalability of system 100 and/or computing device.

With continued reference to FIG. 1, processor may be designed and/or configured to perform any method, method step, or sequence of method steps in any embodiment described in this disclosure, in any order and with any degree of repetition. For instance, processor may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a processor. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, control module 116 is configured to receive a user input 120 from a user using a user device 124. As used in this disclosure, a "user input" refers to any information or data provided by a user to system 100. A "user," for the purposes of this disclosure refers to any user that may be associated with vehicle care 104. User may include a consumer, an employee, an employer, a $3^{rd}$ party, a prospective consumer, a prospective employee, an agent working on behalf of the vehicle care 104, a government agent, an inspector, a prospective purchaser of a business, and the like. In a non-limiting example, a user may include an individual who is interested in getting a vehicle care 104 for a vehicle owned by the individual. In an embodiment, user input 120 may include user identifying information such as, without limitation, name, age, gender, occupation, address, and the like. A "user device," for the purpose of this disclosure, is any additional computing device used by user to access and/or interact with digital content or services, such as a mobile device, laptop, desktop computer, or the like. In a non-limiting embodiment, user device 124 may be a computer and/or smart phone operated by a user in a remote location. User device 124 may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 124 may include a graphical user interface (GUI) configured to display any information from system 100 such as a visual interface as described in further detail below. User device 124 may further include any device that is capable of transmitting information either wirelessly or through wired communication to another device such as plurality of edge devices 112 and/or control module 116. In a non-limiting example, user input 120 may be input into user device 124 by a user. User device 124 may transmit user input 120 to control module 116 across a wireless connection. Transmition of user input 120 may be further handled by one or more edge devices; for instance, and without limitation, one or more edge devices may perform any processing steps described in this disclosure. Wireless connection may be any suitable connection (e.g., radio, cellular).

Still referring to FIG. 1, user input 120 includes a vehicle care command 128. As used in this disclosure, a "vehicle care command" is an instruction that directs the operation of one or more vehicle care devices of plurality of vehicle care devices 108 to perform vehicle care 104. Vehicle care command 128 includes at least a vehicle care device identifier 132 associated with at least a vehicle care device 136 of plurality of vehicle care devices 108. In some cases, for example, and without limitation, when vehicle care command 128 contains instructions that directs one or more operations that require more than one vehicle care devices, vehicle care command 128 within user input 120 may include a plurality of vehicle care device identifiers. A "vehicle care device identifier," for the purpose of this disclosure, is a unique identifier that distinguishes one vehicle care device from other vehicle care devices within plurality of vehicle care devices 108 in system 100. In an embodiment, identifier may include a combination of alphanumeric characters, codes, or symbols that represent a specific device within system 100, enabling system 100 to recognize, manage, and communicate with device efficiently. In some cases, at least a vehicle care device identifier 132 may allow control module 116 to differentiate between plurality of vehicle care devices 108, ensuring that vehicle care command 128 correctly target to the intended at least a vehicle care device. In some cases, vehicle care device identifier 132 may be generated and assigned, by control module 116, to each vehicle care device of plurality of vehicle care devices 108, or it may be pre-configured by the corresponding device manufacture. For instance, and without limitation, control module 116 may be configured to hash one or more vehicle care device data into a vehicle care device identifier 132 using one or more hashing algorithms as described above. Vehicle care device datum disclosed here is described below in further detail. In a non-limiting example, plurality of vehicle care devices 108 may include a plurality of self-service vacuum machines, vending machines, and/or car wash stations. Each vehicle care device in system 100 may be assigned a unique identifier (i.e., vehicle care device identifier 132) such as, without limitation, vac_01a (i.e., the first self-service vacuum machine located at the front of vehicle care site), vac_02a (i.e., the second self-service vacuum machine located at the front of vehicle care site), ven_ex01 (i.e., the first external vending machine providing vehicle care products), wash_01_auto (i.e., the first car wash station with an automatic brush system), wash_02_thp (i.e., the second car wash station with a touchless high-pressure system), and the like. By using these unique vehicle care device identifiers 132, system 100 may effectively manage and control each vehicle care device individually. For example, and without limitation, if a user selects a specific vacuum machine through user device 124, control module may be configured to transmit vehicle care command 128 to "vac_01a" or "vac_02a" based on the user's choice, ensuring that the correct vehicle care device is activated.

Still referring to FIG. 1, in some cases, vehicle care command 128 may include at least a vehicle care parameter 140. At least a "vehicle care parameter," for the purpose of this disclosure, refers to a specific setting or value associated with vehicle care command 128 that influences the operation, performance, or outcome of a vehicle care device of plurality of vehicle care devices 108 or vehicle care 104. In a non-limiting example, at least a vehicle care parameter 140 may specify a particular vehicle care type such as, without limitation, car wash, interior cleaning, detailing, paint protection, window tinting, tire services, oil change, and the like. In another non-limiting example, at least a vehicle care parameter 140 may specify a particular vehicle care products such as, without limitation, car wash soap, microfiber towels, interior cleaning products, wax and polish, tire shine, class cleaner, air fresheners, scratch repair kits, and the like. In a further non-limiting example, at least a vehicle care parameter 140 may specify a particular vehicle care location (e.g., location of nearest vehicle care site, vehicle care site with highest customer review, and the like) for performing vehicle care 104. Other exemplary embodiment of vehicle care parameters 140 may include, without limitation, vehicle care duration (e.g., car wash duration, vacuum duration, etc.,), operation settings (e.g., water temperature, water pressure, soap concentration, vacuum suction power, drying method, product dispensing, etc.,), and the like.

In a non-limiting example, and still referring to FIG. 1, vehicle care command 140 may include a car wash command, wherein the car wash command is a command that activates a specific car wash program, such as a basic wash, deluxe wash, or premium wash, based on the user's preferences. In another non-limiting example, vehicle care command 140 may include a vacuum command, wherein the vacuum command is a command that activates a self-service vacuum machine for a designated period, allowing the user to clean the interior of their vehicle. In another non-limiting example, vehicle care command 140 may include a vending machine command, wherein the vending machine command is a command that dispenses a specific product, such as a car air freshener or windshield wiper fluid, from a vehicle care device such as a vending machine, based on the user's selection. In another non-limiting example, vehicle care command may include a device configuration command, wherein the device configuration command is a command that adjusts the settings or parameters of a vehicle care device, such as the water temperature or pressure in a car wash, to suit the user's preferences or the specific requirements of their vehicle. In a further non-limiting example, vehicle care command may include a facility access command, wherein the facility access command is a command that grants the user access to a restricted area within the vehicle care site, such as a members-only parking zone or a secure storage area for personal belongings.

With continued reference to FIG. 1, user input 120 includes at least a user authentication datum 144. As used in this disclosure, a "user authentication datum" is a piece of information or data used to verify a user's identity within system 100. In an embodiment, at least a user authentication datum 144 may help ensure that only authorized user can access system 100 and devices/components thereof, protecting system 100 from unauthorized access and maintaining security and privacy. In some cases, at least a user authentication datum 144 may come from various forms, such as, without limitation, passwords, tokens, or biometric information combined with a unique identifier representing the user such as, without limitation, a username (e.g., email address), to establish a user's identity within system 100. In a non-limiting example, at least a user authentication datum 144 may include a password the user previously set up during registration of a user account. Such password may be validated by control module 116 during user/vehicle care command 128 authentication as described below. In some cases, user may be optionally associated with a right 148. In an embodiment, right 148 may be linked to the at least a user authentication datum 144 associated with the user. In a non-limiting example, at least a user authentication datum 144 may optionally include one or more data elements that describe right 148. As used in this disclosure, a "right" refers to a specific privilege or permission at vehicle care site. In an embodiment, at least a right 114 may include an entitlement granted to the vehicle, user (as the vehicle owner), and/or any individual at vehicle care site (e.g., employee, visitor, guest, or the like) based on their relationship with vehicle care site (i.e., membership). As a non-limiting example, right 148 may include a parking right (e.g., a reserved parking space). In another non-limiting example, a right 148 may include access to one or more restricted areas (e.g., loading zone, maintenance area, secure facility, and/or the like). For another non-limiting example, right 148 may include discounts or incentives; vehicle care site may offer discount or incentives for certain customers, such as user 106 with membership or employee at vehicle care site. In a further non-limiting example, right 148 may include a prepaid service (e.g., car washes, fuel purchases, maintenance services, and/or any vehicle care described in this disclosure with no additional payment required).

Still referring to FIG. 1, in some cases, right 148 may be determined based on the membership status of the user. A "membership status," as described herein, is a classification or standing of user within vehicle care site based on the user's participation, engagement, or otherwise adherence to the terms and conditions of a membership program. Right 148 that user as a member may be entitled to receive and may be subject to change based on factors such as, without limitation, duration of membership, payment of fees, accumulation of loyalty points, or fulfillment of specific requirements. As an example, and without limitation, membership status may be categorized in a tiered membership levels: "Good," "Better," and "Best." Higher membership tiers may grant right 148 with more exclusive benefits or privileges. "Good" membership level may signify that user has a low membership status, and "best" membership level may signify that user has a higher membership status. A different tier of a membership level may allow a user to have increased benefits (e.g., access to special vehicle care, discounts on vehicle care, reward points or increased reward points gained after a vehicle care 104, and the like.) at the vehicle care site. In some cases, user may not be associated with any rights. In a non-limiting example, a guest user may be able to enter vehicle care site for a limited vehicle care.

In a non-limiting example, and still referring to FIG. 1, at least a user authentication datum 144 may include membership data related to the user, wherein the membership data may include information related to the membership of the user as described above. In some cases, membership data of the user may signify a status of the user; for instance, and without limitation, membership data of a first user may include a first membership level signifying that the first user is a consumer, whereas membership data of a second user may include a second membership level signifying that the second user is an employee of the vehicle care site, wherein the second membership level may be different (e.g., higher) than the first membership level. As a non-limiting example, second user with second membership level may have access to differing amenities such as access to restricted facilities or rooms at vehicle care site, while the first user with first membership level does not.

With continued reference to FIG. 1, in some cases, at least a user authentication datum 144 may include a token 152. As used in this disclosure, a "token" is a unique identifier that represents the user's access, authorization, or otherwise entitlement to vehicle care 104 within system 100. In some cases, token 152 may be a digital asset associated with the user. In a non-limiting example, token 152 may include a QR code associated with user. "QR code" or "Quick Response Code," for the purposes of this disclosure, is a two-dimensional barcode capable of containing data. A "barcode," for the purposes of this disclosure, is a machine-readable code in which processor may receive and convert into numbers, alphanumeric strings and the like. In a non-limiting example, QR code may consist of black and white squares arranged in a specific pattern, wherein user input 120 may be encoded as a form such as, without limitation, vehicle care command 128, at least a user authentication datum 144, and/or the like. In some cases, QR code may include a static QR code, wherein the static QR code is a type of QR code that contains fixed, unchangeable data. For example, and without limitation, once static QR code is generated, information encoded in static QR code may not be modified. In a non-limiting example, generation of QR code may include utilizing, by control module 116, a QR code generator and/or software, wherein the QR code generator and/or software may receive user input 120 and output a QR code that is associated with vehicle care command 128, at least a user authentication datum 144, and/or any other information related to the user. Control module 116 may generate a static QR code containing at least a user authentication datum 144 such as a unique membership ID that links to the user's account, wherein the unique membership ID remains the same throughout the user's membership (even the user cancels the membership).

Still referring to FIG. 1, in other cases, QR code may include a dynamic QR code. As used in this disclosure, a "dynamic QR code" is a type of QR code that contains changeable data. In an embodiment, dynamic QR code may be linked to control module 116 that allows encoded data to be updated or modified without changing, modifying, or otherwise regenerating the QR code (appearance). In some cases, dynamic QR code may be time-sensitive; for instance, and without limitation, dynamic QR code may include an expiration date or may be regenerated by control module 116 at each pre-determined time period. In a non-limiting example, control module 116 may generate a dynamic QR code containing a user profile each time the user visits the vehicle care site, wherein the user profile may be updated by the user and/or system 100 at any time. User profile may be used as at least a user authentication datum 144 to gain access, for example without limitation, a loyalty program offered by the vehicle care site.

Additionally, or alternatively, and still referring to FIG. 1, user device 124 may include a visual interface 156, wherein the visual interface 156 may be configured to display token 152. In such embodiment, user input 120 may be a visual input. As used in this disclosure, a "visual interface" is a digital display that presents information, options, interactive elements to users in an intuitive and visually appealing manner. In some embodiments, visual interface 156 may include at least an interface element. As used in this disclosure, "at least an interface element" is a portion of visual interface 156. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like.

Still referring to FIG. 1, in some cases, event handler may include a cross-session state variable. As used herein, a "cross-session state variable" is a variable recording data entered on user device 124 during a previous session. Such data may include, for instance, previously entered text, previous selections of one or more elements as described above, or the like. For instance, and without limitation, cross-session state variable data may represent a search a user entered in a past session. Cross-session state variable may be saved using any suitable combination of client-side data storage on remote device and server-side data storage on processor. Data may be saved wholly or in part as a "cookie" which may include data or an identification of user device 124 to prompt provision of cross-session state variable by processor, which may store the data on processor. Alternatively, or additionally, control module 116 may use at least a user authentication datum 144, vehicle care device identifier 132, and/or the like to retrieve cross-session state variable, which control module 116 may transmit to user device 124. Cross-session state variable may include at least a prior session datum. A "prior session datum" may include any element of data that may be stored in a cross-session state variable. Visual interface 156 may be further configured to display the at least a prior session datum, for instance and without limitation auto-populating user query data from previous sessions. In a non-limiting example, visual interface 152 may include user selected services, membership level, offers, user information, and/or the like. Advantageously, control module 116 may store previous selections such that a user does not have to enter user input 120 during each visit. In some instances, user may be prompted to make new selections if one or more of their saved selections is not available. Visual interface 156 may be consistent with any personalized user interface as described in U.S. patent application Ser. No. 18/196,174, filed on May 11, 2023, entitled "A METHOD AND AN APPARATUS FOR A PERSONALIZED USER INTERFACE," which is incorporated by reference herein in its entirety.

In a non-limiting example, and still referring to FIG. 1, visual interface 156 may include at least an interface element, for example, an image box, wherein the image box may be configured to host and display token 152 generated by control module 116 as a function of user input 120 such as, without limitation, a static/dynamic QR code. In some cases, event handler may transmit data from user device 124 to control module 116 or receive data from control module 116 to user device 124. In a non-limiting example, token 152 may be hidden on visual interface 156. Visual interface 156 may further include an interface element, for example, a button with an event handler configured to request static/dynamic QR code. In some cases, user may visually present token 152 to a token reading device 160 via visual interface 156 to access services or features within vehicle care site. As used in this disclosure, a "token reading device" is a device designed to detect, read, and verify token 152. In an embodiment, token 152 may allow for quicker transmission of user input 120 or related data to control module 116, wherein token reading device 160 may be used to easily access token 152. Token reading device 160 may be incorporated within at least a vehicle care device 136 and communicatively connected to control module 116. In a non-limiting example, at least a vehicle care device 136 of plurality of vehicle care device 108 may include a token reading device, wherein the token reading device may include a camera configured to detect and read token 152 visually presented through visual interface 156 using user device 124. Token reading device may scan a static/dynamic QR code associated with the user, decode the QR code into user input 120 containing at least a user authentication datum 144, and transmit decoded user input 120 to control module 116. In such embodiment, token 152 containing QR code may provide a more secure process of handling user input 120 as QR code may not be easily copied and inspected. Additionally, or alternatively, token reading device 160 may be communicated connected to one or more edge devices 112 as described above.

With further reference to FIG. 1, in some embodiments, token 152 may include a radio frequency identification (RFID). As used in this disclosure, "radio frequency identification" is a user identification which uses radio waves to wirelessly identify and track users. In an embodiment, user device 124 may be enabled with Near Field Communication (NFC) technology. As used in this disclosure, a "Near Field Communication (NFC)" is a technology that allows NFC enabled device to execute a plurality of communication protocols, thereby enabling a communication between NFC enabled device and an external device such as, without limitation, token reading device 160 containing an NFC reader, over a distance of 4 cm (1.5 inches) or less. As used in this disclosure, an "NFC reader" is a device that allows two-way communication between electronic devices (e.g., NFC enabled user device and token reading device). NFC reader may support a plurality of radio-frequency (RF) protocols such as, without limitation, Zigbee, Bluetooth Low Energy, Wi-Fi, and the like thereof. In some embodiments, token reading device 160 containing NFC reader may initiate the communication; for instance, and without limitation, token reading device 160 may send one or more commands to NFC enabled user device 124 within a distance via magnetic field such as, without limitation, command to accept user authentication datum 144 containing token 152, and/or any processing steps described below in this disclosure. In other cases, user device 124 with NFC enabled may automatically send user authentication datum 144 to token reading device 160 containing the NFC reader, when the user approaches to vehicle care device at a certain distance. In a non-limiting example, at least a vehicle care device 136 may be able to function properly once NFC reader embedded within token reading device 160 successfully detect and read user authentication datum 144 from NFC enabled user device 124. Further, NFC reader embedded within token reading device 160 may be implemented using a web NFC application programming interface (API) such as, without limitation, NDEFReader interface, wherein the web NFC API is a low-level API that provides sites/apps the ability to read and write to user device 124.

Still referring to FIG. 1, in other embodiments, token 152 may include a Non-Fungible Token (NFT). As used in this disclosure, a "Non-Fungible Token" is a unique and non-interchangeable unit of data stored on an immutable sequence listing representing ownership of an asset and/or a financial interest. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement a ledger, where data entries that have been posted to the immutable sequential listing cannot be altered. An immutable sequential listing may include a directed acyclic graph. As used in this disclosure, a "ledger" is a digital immutable ledger where data entries may be posted and cannot be altered. Ledger may be distributed across some or all nodes on network, such as a peer-to-peer network, whereby each node replicates and saves an identical copy of ledger and updates itself independently. A common example of an immutable sequential listing is a blockchain. In a non-limiting example, token 152 may include a digital representation of a digital wallet associated with user, wherein the digital wallet may include a plurality of NFTs, wherein plurality of NFTs may prove ownership of an asset and/or financial interest. Control module 116 may be configured to record token 152 in immutable sequence listing and/or ledger. System 100 may utilize cryptographic keys and digital signatures to ensure network node security and/or authenticity. System 100 may utilize digitally signed assertions as described in more detail below in reference to FIG. 4

With continued reference to FIG. 1, control module 116 is configured to validate vehicle care command 128 as a function of the at least a user authentication datum 144 using a validation module 164 connected to a data store 168. As used in this disclosure, a "validation module" is a component responsible for validating and/or verifying a given credential, a certification, or otherwise an entitlement. As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, vehicle care command 128, against a specification. In some cases, control module 116 may be additionally configured to validate a product by validating constituent sub-products. In some embodiments, control module 116 may be configured to validate any product or data, for example without limitation, vehicle care command 128. Validation module 164 is configured to validate vehicle care command 128 by verifying at least a vehicle care device identifier 132 against a plurality of vehicle care device data 172 stored in the data store 168 and verifying at least a user authentication datum 144 against a plurality of user profiles 176 stored in data store 168. As used in this disclosure, "verification" is a process of ensuring that which is being "verified" complies with certain constraints, for example without limitation system requirements, regulations, and the like. In some cases, verification may include comparing a product, such as without limitation vehicle care device identifier 132 and/or user authentication datum 144, against one or more acceptance criteria. For example, in some cases, user authentication datum 144 may be required to contain certain membership data. For another example, in some cases, vehicle care device identifier 132 may be required to represent a currently available vehicle care device. Ensuring that vehicle care device identifier 132 and/or user authentication datum 144 is in compliance with acceptance criteria may, in some cases, constitute verification. In some cases, verification may include ensuring that data is complete, for example that all required data types are present, readable, uncorrupted, and/or otherwise useful for control module 116. In some cases, some verification processes may be performed by plurality of edge devices 108 as described above.

Still referring to FIG. 1, it should be noted that data store 168 may be accessed by any computing device such as, without limitation, user device 124, control module 116, and the like, using authorization credentials associated with user (i.e., user authorization datum 144). In an embodiment, data store 144 may include a database. In some embodiments, a "data store" may be referred to as a "database." Data store 168 may be implemented, without limitation, as a relational database, a key-value retrieval database such as a NOSQL database, or any other format or structure for use as a database that a person skilled in the art would recognize as suitable upon review of the entirety of this disclosure. Data store 168 may alternatively or additionally be implemented using a distributed data storage protocol and/or data structure, such as a distributed hash table or the like. Data store 168 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

Still referring to FIG. 1, as used in this disclosure, "vehicle care device data" refers to the collection of information associated with each vehicle care device of plurality of vehicle care devices 108 within system 100. In some cases, plurality of vehicle care device data 172 may include device's features, capabilities, operational status, location, any relevant information necessary for system 100 to manage and control plurality of vehicle care devices 108. In an embodiment, plurality of vehicle care device data 172 may include a vehicle care device description, wherein the vehicle care device description includes information about the device's features and capabilities, such as the type of vehicle care 104 (e.g., vacuuming, car wash, vending machine, and the like), power requirements, additional functionalities (e.g., automatic shut-off, adjustable pressure settings, and the like). In another embodiment, plurality of vehicle care device data 172 may include a vehicle care device location, wherein the vehicle care device location includes information about the physical location of vehicle care device within the vehicle care site. In some cases, vehicle care device location may include a digital location within digital environment as described above; for instance, and without limitation, vehicle care device location may include an IP address, an endpoint, an access point configured for control module 116 to identifying plurality of vehicle care devices 108 within the network. In another embodiment, plurality of vehicle care device data 172 may include a vehicle care device operational status, wherein the vehicle care device operational status includes information about vehicle care device's current operational status; for instance, and without limitation, vehicle care device operational status may indicate whether a vehicle care device is "active," "idle," or undergoing "maintenance." In another embodiment, plurality of vehicle care device data 172 may include a vehicle care device maintenance history, wherein the vehicle care device maintenance history includes a record of a vehicle care device's maintenance history such as, without limitation, when the vehicle care device last serviced, any repairs performed, any parts replaced, and the like. In a further embodiment, plurality of vehicle care device data 172 may include a vehicle care device usage statistics, wherein the vehicle care device usage statics includes a vehicle care device's usage statistics (e.g., total number of users served, average usage duration, revenue generated, and the like).

Still referring to FIG. 1, as used in this disclosure, a "user profile" is a digital representation of a user's information. In an embodiment, each user profile of plurality of user profiles 176 may include a user's identification information such as, without limitation, name, age, gender, occupation, address, and the like. In another embodiment, each user profile of plurality of user profiles 176 may be linked to a user authentication datum 144 as described above such as, without limitation, username/password, token 152, and the like, associating right 148 to the user. In a further embodiment, each user profile of plurality of user profiles 176 may include a vehicle profile. As used in this disclosure, a "vehicle profile" is information referring to one or more vehicle of user that may be associated with a vehicle care 104. For example, and without limitation, vehicle profile may include the make and model of a user's vehicle, wherein the make and model may signify the type of vehicle care 104 necessary to be properly performed on the vehicle. In some cases, vehicle profile may include the license plate number of the vehicle. In some cases, vehicle profile may further include the color of the vehicle, any additions to the interior or exterior of the vehicle (e.g., a roof rack, or a bike rack situated on the back of the vehicle). In some cases, vehicle profile may include any damage to the vehicle and the location of the damage. Determination of any damage to a vehicle and the location thereof may allow for proper vehicle care 104 in damaged areas. In some cases, vehicle profile 136 may include dimensions of a vehicle, such as height, length, and width. In a non-limiting example, vehicle profile may be consistent with any vehicle report disclosed in U.S. patent application Ser. No. 18/195,760, filed on May 10, 2023, entitled "APPARATUS AND METHOD OF VEHICLE PROFILING," which is incorporated by reference herein in its entirety.

Still referring to FIG. 1, user input 120 may further include a vehicle care execution datum 180. Validating vehicle care command 128 may further include validating vehicle care command 128 as a function of the vehicle care execution datum 180. As used in this disclosure, a "vehicle care execution datum" is a data element related to a specific transaction required by a particular vehicle care. In an embodiment, vehicle care execution datum may include user's payment information. In a non-limiting example, vehicle care execution datum 180 may include user's payment method and details, such as credit card information (e.g., card holder name, card number, expiration date, CVV, and the like), digital wallet (e.g., digital currency or cryptocurrency balance), loyalty points (e.g., rewards, coupons, and the like). In another non-limiting example, vehicle care execution datum 180 may include a user pre-defined payment method. Vehicle care execution datum 180 may be associated with user profile and stored in data store 168 as described above. In a non-limiting example, validating vehicle care command 128 may include verifying payment information such as checking the credit card number, remaining balance, reward/coupon validity, and/or the like.

With continued reference to FIG. 1, control module 116 is configured to generate a validation datum 184 as a function of the validation of the vehicle care command 128. A "validation datum," for the purpose of this disclosure, is a proof of authenticity that can be used to confirm user's identity, access rights or entitlements, vehicle care command execution within vehicle care site. In some cases, validation datum 184 may be generated, using validation module 164, by verifying at least a user authentication datum 144. In some cases, verifying at least a user authentication datum 144 may include confirming token 152 associated with the user is genuine, unexpired, and/or grants the appropriate right 148. For instance, and without limitation, validating token 152 may include extracting relevant data (e.g., token expiration date, membership status/level, user information, vehicle profile, and the like) from token 152 via token reading device 160. In some cases, generating validation datum 184 may include matching data extracted from token 152 to data stored in data store 168 such as plurality of vehicle care device data 172 and/or plurality of user profiles 176. In other cases, generating validation datum 184 may include verifying a token authenticity by examining cryptographic elements such as, without limitation, digital signatures to ensure that token 152 is issued by a trusted source and hasn't been tampered with.

In a non-limiting example, user input 120 may specify a particular vehicle care 104 such as, without limitation, a premium car wash service (i.e., vehicle care command 128). User may scan a dynamic QR code which contains a time-sensitive user authentication token linked to the user account associated with the vehicle care site. Control module 116 may receive the scanned authentication token from the user's dynamic QR code via token reading device 160. Control module 116 may validate whether the premium car wash service is valid for the user using validation module 164 by assessing plurality of user profiles 176 stored in data store 168. Validation module 164 may be configured to search plurality of user profiles 176 for a matching user profile, wherein the matching user profile may be determined by matching data encoded within user authentication datum 144 such as, without limitation, user's identification information, vehicle profile, membership status, and/or the like. Validation module 164 may then generate a validation datum 184 as a function of the user authentication datum verification, wherein control module 116 may restrict user from getting the premium car wash service if the validation datum indicates an unsuccessful user authentication datum verification. Such restriction may be applied to the user until a validation datum indicating a successful user authentication verification is generated by validation module 164 and recognized by control module 116.

With continued reference to FIG. 1, in other cases, validation datum 184 may be generated, using validation module 164, by verifying at least a vehicle care device identifier 132 within vehicle care command 128 specified in user input 120. In a non-limiting example, user input 120 may include a vehicle care command to activate a selected vehicle vacuum machine with a vehicle care device identifier of "vac_02a." Verifying the vehicle care device identifier "vac_02a" may include retrieve the vehicle care device identifier "vac_02a" from the vehicle care command and access plurality of vehicle care device data 172 (containing plurality of vehicle care device identifiers) stored in data store 168 and search plurality of vehicle care device data 172 for a matching vehicle care device identifier "vac_02a." Upon finding the matching vehicle care device identifier in plurality of vehicle care device data 172, validation module 164 may check the associated vehicle care device's data such as, without limitation, operational status, location, and other relevant information to ensure the associated vehicle care device is available for use and compatible with the requested vehicle care command. For instance, and without limitation, validation module 164 may generate a validation datum 184 as a function of the vehicle care device identifier verification, wherein control module 116 may restrict user from accessing the vehicle vacuum machine "vac_02a" if the validation datum indicates that vehicle vacuum machine "vac_02a" is currently active or under maintenance. Such restriction may be applied to the user until a validation datum indicating that vehicle vacuum machine "vac_02a" is now idle.

Additionally, or alternatively, and still referring to FIG. 1, generating validation datum 184 may include executing a vehicle care execution protocol 188 as a function of the validation of vehicle care execution datum 180 as described above. As used in this disclosure, a "vehicle care execution protocol" refers to a predefined set of rules and procedures that govern how a transaction is initiated, processed, and completed within system 100. In an embodiment, executing vehicle care execution protocol 188 may include communicating with a payment gateway to process verified vehicle care execution datum 180, wherein the payment gateway is a service that facilities a secure processing of an electronic payment transactions between two parties (e.g., vehicle care site and the user). In some cases, payment gate may act as an intermediary between a point-of-sale terminal and user's financial institution (e.g., bank or credit card provider). In a non-limiting example, token reading device 160 may be configured to read vehicle care execution datum 180 from user input 120, wherein the token reading device 160 may include a card reader configured to read vehicle care execution datum 180 (e.g., credit card information) from a magnetic-strip card. Processing such vehicle care execution datum 180 may include processing a payment for the requested vehicle care 104 specified by vehicle care command 128. Validation module 164 may securely transmit the payment information and receive confirmation of a successful transaction. Validation datum 184 related to requested vehicle care 104 may then be generated, by validation module 164, upon successful transaction. In some cases, control module 116 connected with the validation module 164 may be configured to log the user and related activity (e.g., user-selected vehicle care and/or associated vehicle care execution protocol 188). In a non-limiting example, control module 116 may record the execution of vehicle care execution protocol 188; for instance, and without limitation, control module 116 may record the transaction details, including user information, vehicle care type, payment method, transaction timestamp, and the like in data store 168 for record-keeping and auditing purposes.

With further reference to FIG. 1, generating validation datum 184 may include associating validation datum 184 to the user and/or corresponding vehicle care device. Such association may ensure that validation datum 184 may be used later to validate user's identity and/or grant access rights. In some cases, validation datum 184 may be stored in data store 168. In a non-limiting example, when user attempts to access a specific service, feature, or resources within vehicle care site, validation module 164 may retrieve validation datum 184 stored in data store 164 as a function of user input 120. Further, validation datum 184 may be periodically updated, by validation module 164, to maintain its security and accuracy either in response to changes in user profile 124 or as a part of a routine security measure.

With further reference to FIG. 1, generating validation datum 184 includes identifying at least an edge device 192 from plurality of edge devices 112 as a function of the verified at least a vehicle care device identifier 132. At least an edge device 192 may be identified, by control module 116, based on its association with at least a vehicle care device 136 with the verified at least a vehicle care device identifier 132. In a non-limiting example, plurality of vehicle care device data 172 stored in data store 168 may further include information related to plurality of corresponding edge devices. In some cases, each vehicle care device identifier within plurality of vehicle care device data 172 may be associated with an edge device location datum, wherein the edge device location datum includes physical and/or digital location of corresponding edge device within the vehicle care site or the network of the vehicle care site. In a non-limiting example, each vehicle care device identifier of plurality of vehicle care device data may be associated with an endpoint of a corresponding edge device. Control module 116 may be able to identify the endpoint of at least an edge device 192 by querying data store 168 as a function of the vehicle care device identifier 132. Additionally, or alternatively, control module 116 may be configured to identify endpoint of a most suitable edge device (i.e., at least an edge device 192) from plurality of edge devices 112 based on information related to plurality of edge devices 112 such as, without limitation, proximity to the vehicle care device, available resources, processing capabilities, and/or the like. In a non-limiting example, information related to plurality of edge devices 112 may include data related to current workload (i.e., the number of tasks or commands currently being processed) of each edge device of plurality of edge devices 112. Control module 116 may be configured to identify at least an edge device 132 from plurality of edge device 112 by selecting at least an edge device 132 with available processing capacity (i.e., edge device with minimum current workload), ensuring that at least an edge device 132 may execute vehicle care command 128 on one or more associated vehicle care devices without excessive delays or resource contention. Other exemplary embodiments of information related to plurality of edge devices 112 may include, without limitation, network latency, device status, process history, and the like.

Still referring to FIG. 1, it should be noted that each edge device of plurality of edge devices 112 may be able to perform, without limitation, any processing step described in this disclosure. Each edge device of plurality of edge devices 112 may be responsible for ensuring that vehicle care execution protocol 188 initiated by control module 116 based on vehicle care execution datum 180 is followed until a deactivation of vehicle care 104 by an interruption signal, performance of vehicle care 104 (e.g., delivery of a vehicle care product), or an (e.g., session) expiration date/time is reached. In an embodiment, the token reading device 160 of at least a vehicle care device 136 may be configured to transmit at least a user authentication datum 144 to at least an edge device 192 of plurality of edge devices 112 connected to at least a vehicle care device 136 by scanning at least a user authentication datum 144 containing token 152. At least an edge device 192 may receive at least user authentication datum 144 from token reading device 160, validate at least a user authentication datum 144 using a local validation module, and grant the user access to at least a vehicle care device 136. In a non-limiting example, each edge device of plurality of edge devices 112 may include a local server, wherein the local server may include a local validation module communicatively connected to at least a portion of data store 168, and wherein the at least a portion of data store 168 may be local to the local validation module. Local validation module may include any validation module as described above and may perform any validation and/or verification of data (e.g., vehicle care command 128, vehicle care device identifier 132, user authentication datum 144, and/or the like) as described above.

Still referring to FIG. 1, in some embodiments, data store 168 may include a distributed data storage system, wherein the distributed data storage system is a data management architecture that stores and manages data such as, without limitation, plurality of vehicle care device data 172, plurality of user profiles 176, and/or the like across multiple interconnected storage devices or nodes such as, without limitation, plurality of edge devices 112. In an embodiment, distributed data storage system may be configured to partition plurality of vehicle care device data 172 and plurality of user profiles 176 into a plurality of data shards, wherein a "data shard," for the purpose of this disclosure, is a smaller and more manageable piece of a larger database. For instance, and without limitation, data shard may include a subset of plurality of vehicle care device data 172 and plurality of user profiles 176. Plurality of data shards may be stored across plurality of edge devices 112. In a non-limiting example, each edge device of plurality of edge devices 112 may include one or more data shards. Plurality of edge devices 112 may be disposed across different geographical locations within vehicle care site. In some cases, plurality of vehicle care device data 172 may be partitioned, by distributed data storage system, based on device type, features, functionalities and/or the like of plurality of vehicle care devices 108; for instance, and without limitation, all vehicle vacuum machines within vehicle care site may be associated (i.e., managed and controlled) by a first edge device or a first group of edge devices of plurality of edge devices 112 while all car wash station may be associated by a second edge device or a second group of edge devices. In some cases, plurality of user profiles 176 may be partitioned, by distributed data storage system, based on membership status/level specified within plurality of user profiles. In a non-limiting example, a first edge device or a first group of edge devices of plurality of edge devices 112 may be connected to one or more vehicle care devices that could only be accessed by users with a first membership level and a second edge device or a second group of edge devices of plurality of edge devices 112 may be connected to one or more vehicle care devise that could only be access by users with a second membership level.

With continued reference to FIG. 1, control module 116 is configured to transmit validation datum 184 to at least an edge device 192. In an embodiment, transmitting validation datum 184 may include transmitting vehicle care command 128 (including at least a vehicle care parameters 140 to at least an edge device 192 identified based on at least a vehicle care device identifier 132. In some cases, validation datum 184 and/or vehicle care command 128 may be communicated by control module 116 to at least an edge device 192 in form of one or more signals. It should be noted that validation datum 184 and/or vehicle care command 128 may also be communicated by control module 116 to at least a vehicle care device 136 directly. As used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, system 100 may perform one or more signal processing steps on a signal. For instance, system 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, transmitting validation datum 184 may include activating, using at least an edge device 192, the at least a vehicle care device 136 as a function of validation datum 184. In an embodiment, activating at least a vehicle care device 136 may include activating one or more necessary vehicle care devices within vehicle care site based on vehicle care command 128 transmitted along with validation datum 184. Activating at least a vehicle care device 136 may include initiating vehicle care 104 as a function of at least a vehicle care parameter 140 using at least a vehicle care device 136. In a non-limiting example, control module 116 may transmit vehicle care command 164 containing a preferred car wash program to an edge device operatively connected to a car wash station upon a successful vehicle care command validation (i.e., user is authenticated, and the car wash station is available), thereby activating the car wash station and initiating the preferred car wash program. In another non-limiting example, user may scan token 152 at a self-service vacuum machine via user device 124. Token reading device 160 integrated within self-service vacuum machine may be configured to detect and read user authentication datum 144 from token 152. At least an edge device 192 may validate a user selected vehicle care command 128 (i.e., vehicle vacuuming) as a function of detected user authentication datum 144. Such validation may be performed solely by at least an edge device 192 via local validation module as described above, wherein the local validation module may communicatively connect to one or more data shards of data store 168. If local validation module successfully finds a matching user profile from plurality of user profiles 176 stored in the data shards, at least an edge device 192 may then activate the self-service vacuum machine and initiate vehicle vacuuming for a predetermined duration (i.e., at least a vehicle care parameter 140), allowing user to clean vehicle's interior, otherwise, at least an edge device 192 may communicate with control module 116 to access other user profiles stored in data store 168; however, self-service vacuum machine may not be activate and/or vehicle vacuuming may not be initiated if there is no matching user profile anywhere within system 100.

Figure 2:
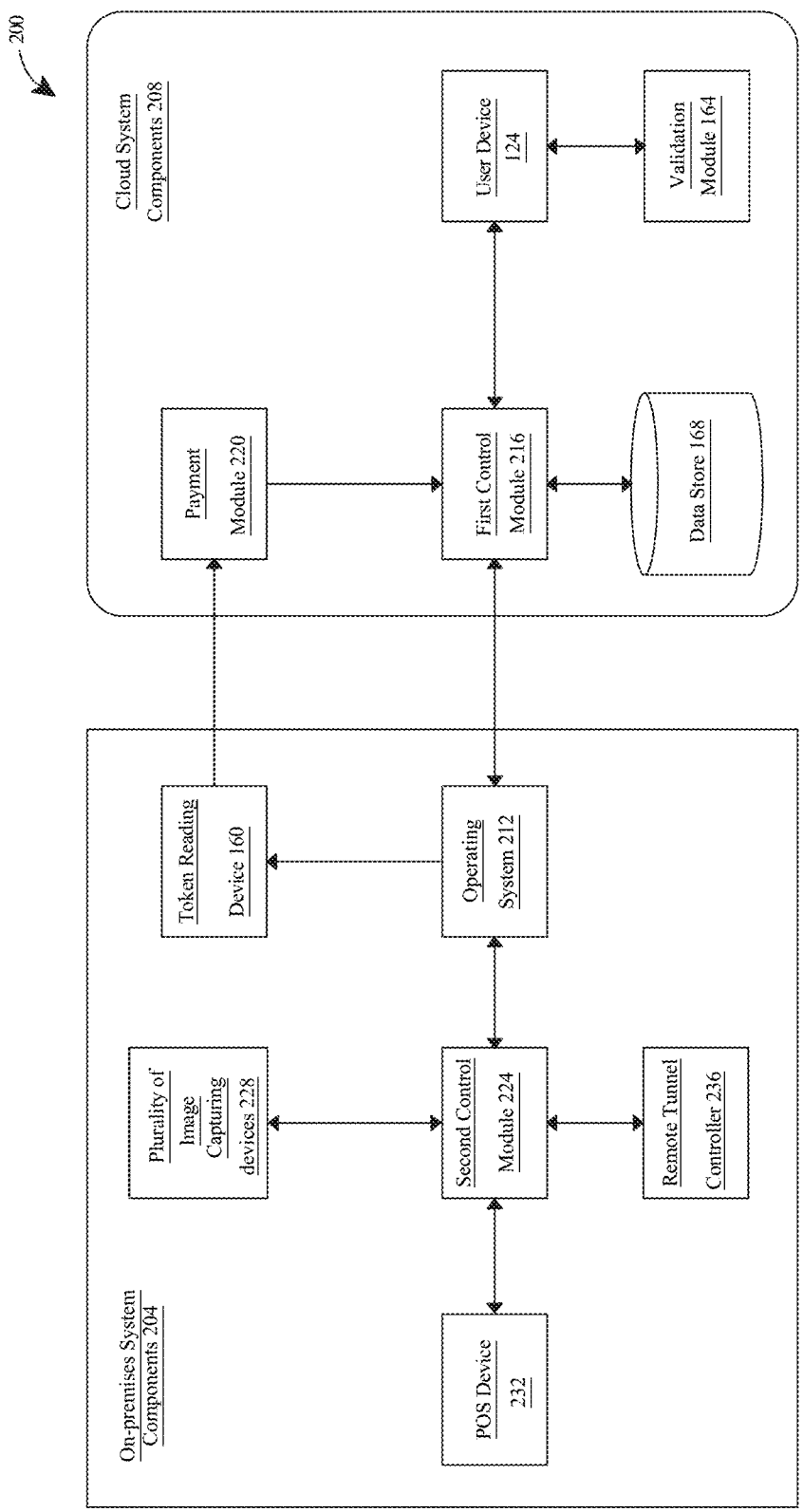
FIG. 2 is a high-level system architecture of system for providing a seamless vehicle care at a vehicle care site.

Referring now to FIG. 2, a high-level system architecture 200 of system 100 for providing a seamless vehicle care 104 at vehicle care site. System architecture 200 may include plurality of on-premises system components 204. As used in this disclosure, "on-premises system components" are components (e.g., computing infrastructure, software, or hardware) that are installed, hosted, and maintained within physical location of vehicle care site. In an embodiment, vehicle care site may be responsible for the management, maintenance, security, and operation of plurality of on-premises system components 204. Exemplary embodiments of on-premises system components are described below in further detail. Additionally, or alternatively, system architecture 200 may include plurality of cloud system components 208. As used in this disclosure, "cloud system components" are components (e.g., computing infrastructure, software, or hardware) that are installed, hosted, and maintained on a cloud environment. As used in this disclosure, a "cloud environment" is a set of systems and/or processes acting together to provide services in a manner that is dissociated with underlaying hardware and/or software within system 100 used for such purpose and includes a cloud. A "cloud," as described herein, refers to one or more servers that are accessed over the network. In some cases, cloud may include Hybrid Cloud, Private Cloud, Public Cloud, Community Cloud, any cloud defined by National Institute of Standards and Technology (NIST), and the like thereof. In some embodiments, cloud may be remote to system 100; for instance, cloud may include a plurality of functions distributed over multiple locations outside system 100. Location may be a data center. In a non-limiting example, validation module 164, local validation module, and/or data store 168 may run on one or more cloud servers.

Still referring to FIG. 1, cloud system components 208 may include implementation of cloud computing. As used in this disclosure, "cloud computing" is an on-demand delivery of information technology (IT) resources within a network through internet, without direct active management by either first entity or second entity. In an embodiment, without limitation, cloud system components 208 may include a Software-as-a-Service (SaaS). As used in this disclosure, a "Software-as-a-Service" is a cloud computing service model which make software available to system 100 directly; for instance, SaaS may deliver ready-to-use software applications over the network, accessible via internet applications (e.g., web browsers or specialized client applications). In some cases, cloud computing may implement various security measure, such as data encryption, identify and access management, network security, and/or the like to protect the infrastructure and data such as, without limitation, plurality user profiles 176. In a non-limiting example, system 100 may include a network component that enable secure and reliable connectivity between data and end users, wherein the network component may include, without limitation, virtual private networks (VPNs), local balancers, content delivery networks (CDNs), and/or the like. Additionally, or alternatively, cloud system components 208 may include tools and/or services for monitoring, logging, and managing the performance, security and availability of cloud resources.

With continued reference to FIG. 2, system architecture 200 may include an operating system 212. As used in this disclosure, an "operating system" refers to the fundamental software that manages and controls various system components as described in this disclosure such as control module 116, plurality of vehicle care devices 108, plurality of edge devices 112, visual interface 156, and/or the like. In an embodiment, operating system 212 may be responsible for executing any processing steps as described in this disclosure. In a non-limiting example, operating system 212 may allocate system resources (e.g., processing power, memory, and/or storage) among various system components and manage the execution of vehicle care commands 128, coordinating the communication between control module 112, plurality of vehicle care devices 108, and plurality of edge devices 112 to provide vehicle care 104.

With continued reference to FIG. 2, operating system 212 may be communicate with a first control module 216, wherein the first control module 216 may be a control module hosted on cloud environment as described above. User device 124 may be communicate with first control module 216. In a non-limiting example, user may use user device 124 for user authentication to gain access to vehicle care site and/or plurality of vehicle care devices 108 within the vehicle care site. User device 124 may allow user to enter user input 120 containing user authentication datum 144, wherein the user authentication datum 144 may be verified by validation module 164. In some cases, validation module 164 may be a cloud system component; for instance, and without limitation, validation module 164 may include a cloud identify provider (IDP) configured to delivers identity and access management (IAM) functionality as a SaaS. First control module 216 may be communicate with data store 168 to enable validation module 164 to access plurality of vehicle care device data 172 and/or plurality of user profiles 176. In this case, data store 168 may include a cloud storage.

With continued reference to FIG. 2, operating system 212 may communicate with one or more token reading device 160 via Bluetooth Low Energy (BLE). In a non-limiting example, token reading device 160 may include a card reader, wherein the card reader is a device used to read and extract data from various types of cards, such as, without limitation, credit cards, debit cards, smart cards, magnetic strip cards, and/or the like. In a non-limiting example, token reading device 160 may be configured to process an electronic payment transaction (i.e., vehicle care execution protocol 188), enabling access to plurality of vehicle care devices 108 and/or vehicle cares 104. Token reading device 160 may be communicate with a payment module 220, wherein the payment module 220 is a system component that handles the processing of vehicle care execution protocol 188 within system 100. In some cases, payment module 220 may be a cloud system component; for instance, and without limitation, payment module 220 may include a set of Application Programming Interfaces (APIs) configured for processing online payment. APIs may include a third-party ($3^{rd}$ party) payment processing APIs. In a non-limiting example, first control module 216 may be configured to manage membership-related data within plurality of user profiles 176 (e.g., create/subscribe to a new membership, retrieving membership status, updating membership status, deleting/unsubscribe membership) via payment module 220 communicatively connected to first control module 216 by utilizing one or more STRIPE APIs. Payment module 220 and payment processing process may be consistent with any payment module 220 and processing steps as described in U.S. patent application Ser. No. 18/196,238, filed on May 11, 2023, entitled "APPARATUS AND METHOD FOR DATA CONVERSION," which is incorporated by reference herein in its entirety.

Additionally, or alternatively, and still referring to FIG. 1, operating system 212 may communicate with a second control module 224, wherein the second control module 224 may be a control module hosted within vehicle care site (i.e., on-premises control module). In a non-limiting example, second control module 224 may include a main controller configured to control plurality of on-site devices (i.e., on-premises system components 204) such as, without limitation, plurality of image capturing devices 228, point-of-sale (POS) devices 232, plurality of vehicle care devices 108, plurality of edge devices 112, and/or the like. In some cases, second control module 224 may utilize plurality of image capturing devices 228 to provide a license plate recognition service, wherein a license plate number, output by the license plate recognition service may be used as user authentication datum 144. Such license plate recognition may be implemented and employed by system 100 as described in U.S. patent application Ser. No. 18/195,537, filed on May 10, 2023, entitled "APPARATUS AND METHOD FOR AUTOMATIC LICENSE PLATE RECOGNITION OF A VEHICLE," which is incorporated by reference herein in its entirety. In some cases, POS devices 232 may include, without limitation, cashdrawer, receipt printer, and/or the like. In a non-limiting example, POS devices 232 may include any POS as described in U.S. patent application Ser. No. 18/196,238, filed on May 11, 2023, entitled "APPARATUS AND METHOD FOR DATA CONVERSION," which is incorporated by reference herein in its entirety. In a non-limiting example, second control module 224 may be configured to communicate with a remote tunnel controller (rTC) 236, wherein the rTC 236 is a device or software application that allows for remote monitoring and control of a car wash tunnel (vehicle care device). rTC 236 may enable second control module 224 to monitor and manage the car wash tunnel from a central location, rather than needing to be physically present on-site. In some cases, rTC 236 may be used to monitor status of plurality of vehicle care devices 108, track vehicle throughput, manage chemical usage, and the like.

Figures 3A, 3B, 3C:
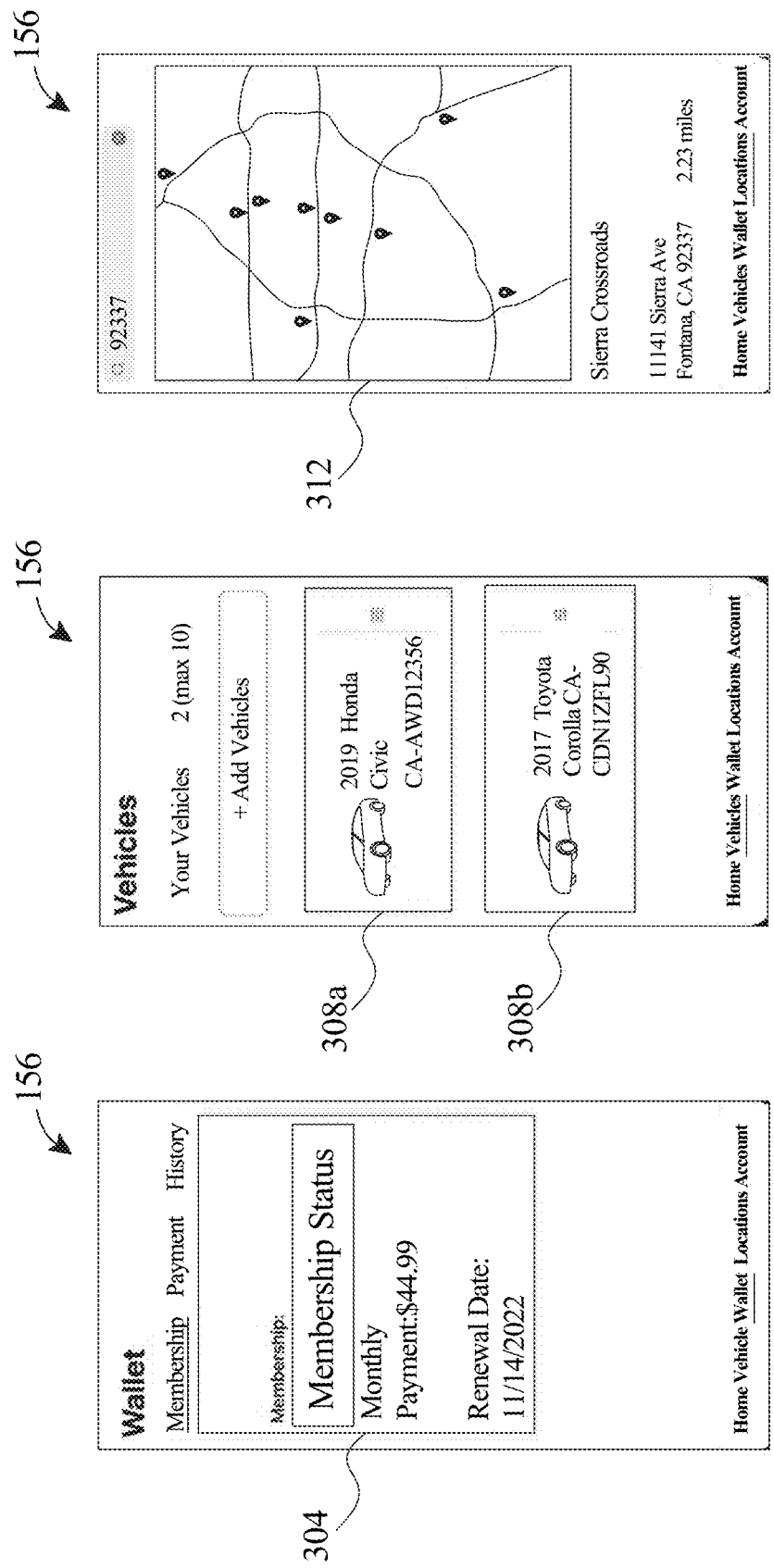
FIGS. 3A-C are exemplary embodiments of visual interface.

Referring now to FIG. 3A-C, exemplary embodiments of visual interface 156 are illustrated. Visual interface 156 may be configured to display any data described in this disclosure. In an embodiment, as shown in FIG. 3A, visual interface 156 may be configured to display at least a portion of user profile such as, without limitation, membership data 304. In a non-limiting example, visual interface 156 may be configured to display user's membership data 304 such as, without limitation, membership status, membership monthly payment, membership renewal date, and/or the like. In another embodiment, as shown in FIG. 3B, visual interface 156 may be configured to display one or more vehicle profiles 308*a-b*. Vehicle profiles may include any vehicle profiles as described above. In a further embodiment, as shown in FIG. 3C, visual interface 156 may be configured to display other data such as, without limitation, geographical data related to vehicle care site; for instance, visual interface 156 may be configured to display various location of vehicle care site via a digital map.

Figure 4:
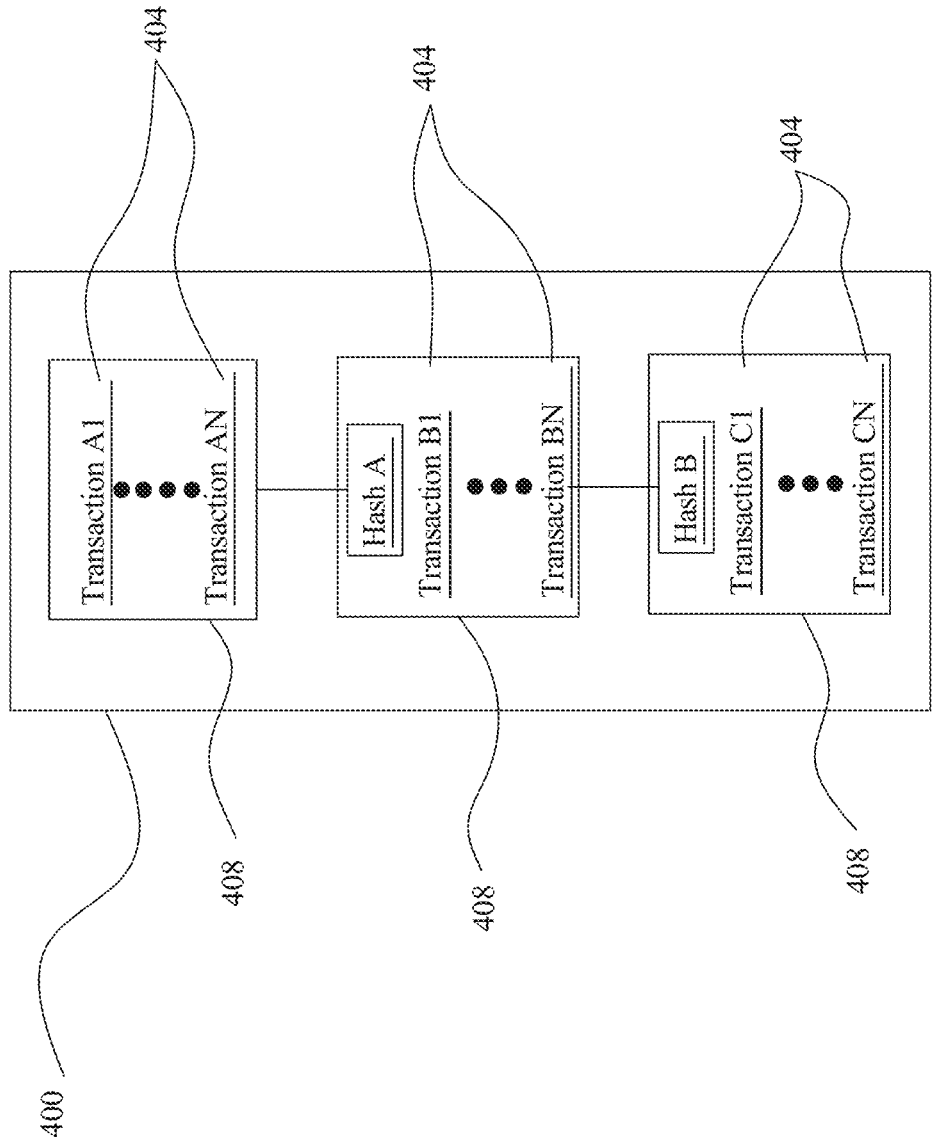
FIG. 4 is a block diagram of an exemplary immutable sequential listing.

Referring now to FIG. 4, an exemplary embodiment of an immutable sequential listing 400 is illustrated. Data elements are listed in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 4, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 408 in a block chain computationally challenging; the incentive for producing sub-listings 408 may include the grant of new crypto-currency to the miners. Quantities of crypto-currency may be exchanged using at least a posted content as described above.

Figure 5:
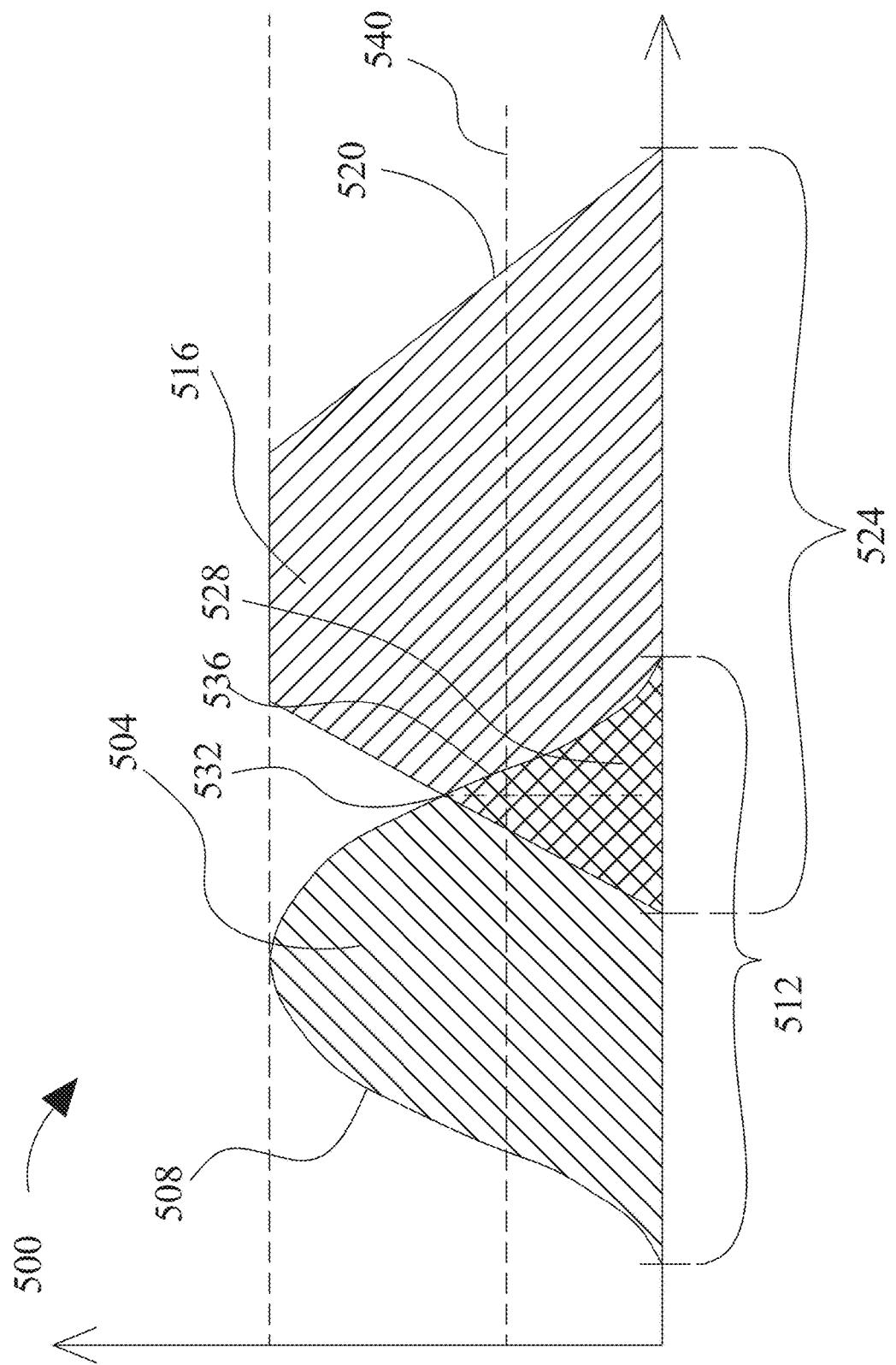
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, user profile, and a predetermined class, such as without limitation of vehicle care command. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or user profile and a predetermined class, such as without limitation vehicle care command categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify a user profile with vehicle care command. For instance, if a vehicle care command has a fuzzy set matching user profile fuzzy set by having a degree of overlap exceeding a threshold, processor may classify the user profile as belonging to the vehicle care command categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a user profile may be compared to multiple vehicle care command categorization fuzzy sets. For instance, user profile may be represented by a fuzzy set that is compared to each of the multiple vehicle care command categorization fuzzy sets; and a degree of overlap exceeding a threshold between the user profile fuzzy set and any of the multiple vehicle care command categorization fuzzy sets may cause processor to classify the user profile as belonging to vehicle care command categorization. For instance, in one embodiment there may be two vehicle care command categorization fuzzy sets, representing respectively vehicle care command categorization and a vehicle care command categorization. First vehicle care command categorization may have a first fuzzy set; Second vehicle care command categorization may have a second fuzzy set; and user profile may have a user profile fuzzy set. processor, for example, may compare a user profile fuzzy set with each of vehicle care command categorization fuzzy set and in vehicle care command categorization fuzzy set, as described above, and classify a user profile to either, both, or neither of vehicle care command categorization or in vehicle care command categorization. Machine-learning methods as described throughout may, in a non-limiting example, generate coefficients used in fuzzy set equations as described above, such as without limitation x, c, and o of a Gaussian set as described above, as outputs of machine-learning methods. Likewise, user profile may be used indirectly to determine a fuzzy set, as user profile fuzzy set may be derived from outputs of one or more machine-learning models that take the user profile directly or indirectly as inputs.

Still referring to FIG. 5, a computing device may use a logic comparison program, such as, but not limited to, a fuzzy logic model to determine a vehicle care command response. An vehicle care command response may include, but is not limited to, amateur, average, knowledgeable, superior, and the like; each such vehicle care command response may be represented as a value for a linguistic variable representing vehicle care command response or in other words a fuzzy set as described above that corresponds to a degree of match of user profile as calculated using any statistical, machine-learning, or other method that may occur to a person skilled in the art upon reviewing the entirety of this disclosure. In other words, a given element of user profile may have a first non-zero value for membership in a first linguistic variable value and a second non-zero value for membership in a second linguistic variable value. In some embodiments, determining a vehicle care command categorization may include using a linear regression model. A linear regression model may include a machine learning model. A linear regression model may be configured to map data of user profile, such as degree of match of user profile to one or more vehicle care command parameters. A linear regression model may be trained using a machine learning process. A linear regression model may map statistics such as, but not limited to, quality of user profile match of user profile. In some embodiments, determining a vehicle care command of user profile may include using a vehicle care command classification model. A vehicle care command classification model may be configured to input collected data and cluster data to a centroid based on, but not limited to, frequency of appearance, linguistic indicators of quality, and the like. Centroids may include scores assigned to them such that quality of match of user profile of user profile may each be assigned a score. In some embodiments vehicle care command classification model may include a K-means clustering model. In some embodiments, vehicle care command classification model may include a particle swarm optimization model. In some embodiments, determining the vehicle care command of a user profile may include using a fuzzy inference engine. A fuzzy inference engine may be configured to map one or more user profile data elements using fuzzy logic. In some embodiments, user profile may be arranged by a logic comparison program into vehicle care command arrangement. A "vehicle care command arrangement" as used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to user profile, such as a degree of match of user profile, while a second membership function may indicate a degree of in vehicle care command of a subject thereof, or another measurable value pertaining to user profile. Continuing the example, an output linguistic variable may represent, without limitation, a score value. An inference engine may combine rules, such as: "if the last service is 'car wash' and the service frequency is 'high', the vehicle care parameter of the vehicle care command is 'car wash'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
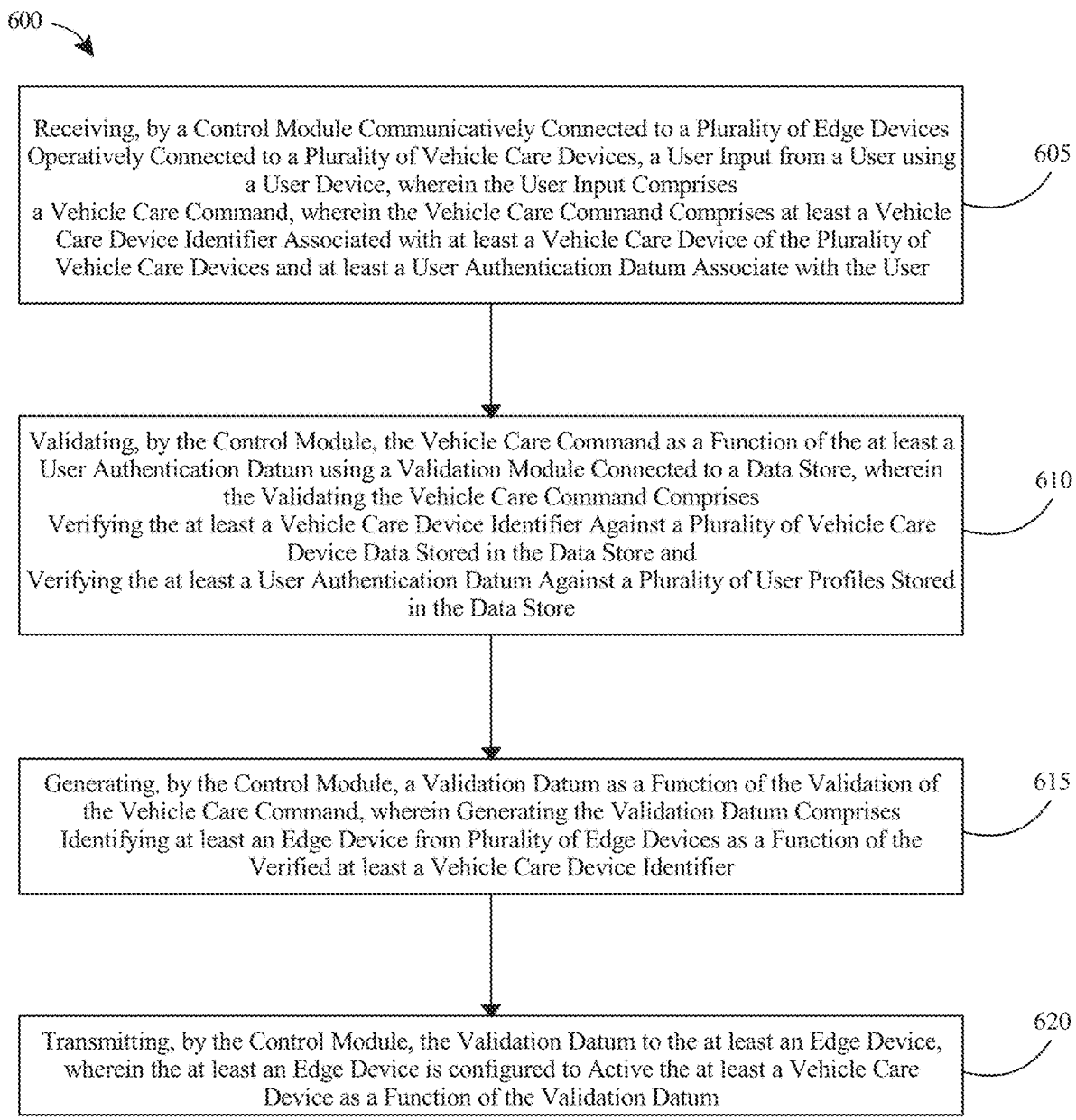
FIG. 6 is a flow diagram of an exemplary method for providing a seamless vehicle care at a vehicle care site.

Now referring to FIG. 6, an exemplary embodiment of a method 600 for providing a seamless vehicle care at a vehicle care site is illustrated. Method 600 includes a step 605 of receiving, by a control module communicatively connected to a plurality of edge devices operatively connected to a plurality of vehicle care devices, a user input from a user using a user device, wherein the user input includes a vehicle care command, wherein the vehicle care command includes at least a vehicle care device identifier associated with at least a vehicle care device of the plurality of vehicle care devices and at least a user authentication datum associated with the user. In some embodiments, vehicle care command may include at least a vehicle care parameter. In some embodiments, vehicle care command the user input comprises a vehicle care execution datum. In some embodiments, the user authentication datum may include a token containing a QR code. This may be implemented, without limitation, as described above in reference to FIGS. 1-5.

With continued reference to FIG. 6, method 600 includes a step 610 of validating, by the control module, the vehicle care command as a function of the at least a user authentication datum using a validation module connected to a data store, wherein validating the at least a token includes verifying the at least a vehicle care device identifier against a plurality of vehicle care device data stored in the data store and verifying the at least a user authentication datum against a plurality of user profiles stored in the data store. In some embodiments, the data store may include a distributed data storage system configured to partition the plurality of vehicle care device data and the plurality of user profiles into a plurality of data shards and store the plurality of data shards across the plurality of edge devices. In some embodiments, validating the vehicle care command may include validating the vehicle care command as a function of the vehicle care execution datum. This may be implemented, without limitation, as described above in reference to FIGS. 1-5.

With continued reference to FIG. 6, method 600 includes a step 615 of generating, by the control module, a validation datum as a function of the validation of the vehicle care command, wherein generating the validation datum includes identifying at least an edge device from the plurality of edge devices as a function of the verified at least a vehicle care device identifier. In some embodiments, at least a vehicle care device may include a token reading device configured to transmit the at least a user authentication datum to at least an edge device of the plurality of edge devices connected to the at least a vehicle care device by scanning the token. In some embodiments, the at least an edge device is configured to receive the at least a user authentication datum from the token reading device, validate the at least a user authentication datum using a local validation module, and grant the user the access to the at least a vehicle care device. In some embodiments, generating the validation datum may include executing a vehicle care execution protocol as a function of the validation of the vehicle care execution datum. This may be implemented, without limitation, as described above in reference to FIGS. 1-5.

With continued reference to FIG. 6, method 600 includes a step 620 of transmitting, by the control module, the validation datum to the at least an edge device, wherein the at least an edge device is configured to activate the at least a vehicle care device as a function of the validation datum. In some embodiments, activating the at least a vehicle care device may include initiating a vehicle care as a function of the at least a vehicle care parameter using the at least a vehicle care device. This may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
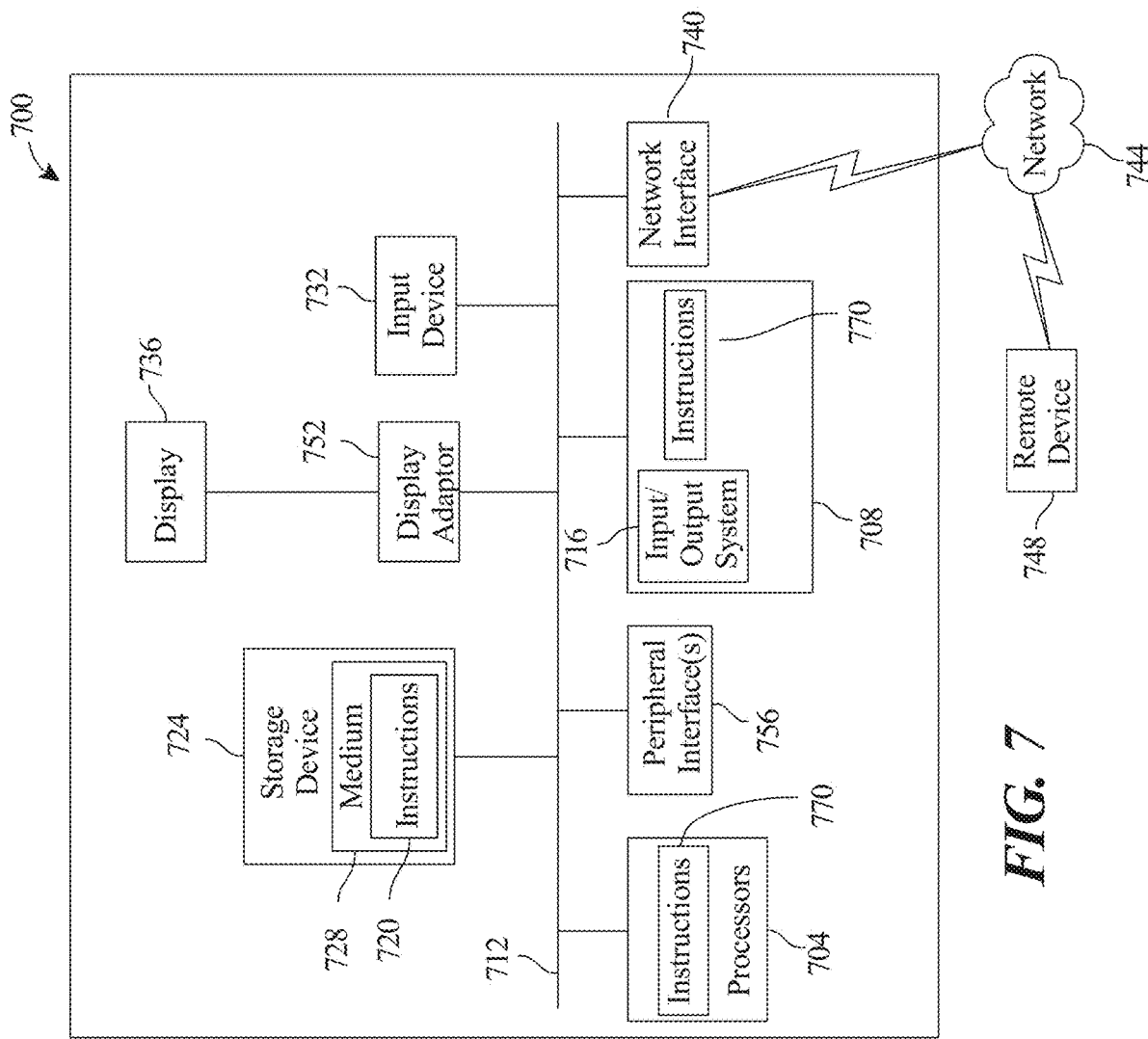
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing a seamless vehicle care at a vehicle care site, wherein the system comprises:
    a plurality of vehicle care devices;
    a plurality of edge devices operatively connected to the plurality of vehicle care devices; and
    a control module communicatively connected to the plurality of edge devices, wherein the control module is configured to:
        receive a user input from a user using a user device, wherein the user input comprises:
            a vehicle care command, wherein the vehicle care command comprises:
                at least a vehicle care device identifier associated with at least a vehicle care device of the plurality of vehicle care devices, wherein the vehicle care device identifier is generated and assigned, by the control module, to each vehicle care device of the plurality of vehicle care devices;
                at least a vehicle care parameter, wherein activating the at least a vehicle care device comprises initiating a vehicle care as a function of the at least a vehicle care parameter using the at least a vehicle care device; and
            at least a user authentication datum associated with the user,
        wherein receiving the user input further comprises:

scanning, using a token reader, the at least a user authentication datum; and generating a token based on the at least a user authentication datum;

validate the vehicle care command as a function of the at least a user authentication datum based on the token using a validation module connected to a data store, wherein validating the vehicle care command comprises:

verifying the at least a vehicle care device identifier against a plurality of vehicle care device data stored in the data store; and verifying the token of the at least a user authentication datum against a plurality of user profiles stored in the data store;

generate a validation datum as a function of the validation of the vehicle care command, wherein generating the validation datum comprises:

identifying at least an edge device from the plurality of edge devices as a function of the verified vehicle care device identifier; and transmit the validation datum to the at least an edge device of the plurality of edge devices; and activate the at least a vehicle care device as a function of the validation datum.

2. The system of claim 1, wherein the user input comprises a vehicle care execution datum.

3. The system of claim 1, wherein the at least a user authentication datum comprises a token containing a QR code.

4. The system of claim 1, where the at least a user authentication datum comprises membership data.

5. The system of claim 1, wherein the data store comprises a distributed data storage system configured to:

partition the plurality of vehicle care device data and the plurality of user profiles into a plurality of data shards; and store the plurality of data shards across the plurality of edge devices.

6. The system of claim 2, wherein validating the vehicle care command comprises validating the vehicle care command as a function of the vehicle care execution datum.

7. The system of claim 2, wherein generating the validation datum comprises:

executing a vehicle care execution protocol as a function of the validation of the vehicle care execution datum.

8. A method for providing a seamless vehicle care at a vehicle care site, wherein the method comprises:

receiving, by a control module communicatively connected to a plurality of edge devices operatively connected to a plurality of vehicle care devices, a user input from a user using a user device, wherein the user input comprises:

a vehicle care command, wherein the vehicle care command comprises:

at least a vehicle care device identifier associated with at least a vehicle care device of the plurality of vehicle care devices, wherein the vehicle care device identifier is generated and assigned, by the control module, to each vehicle care device of the plurality of vehicle care devices;

at least a vehicle care parameter, wherein activating the at least a vehicle care device comprises initiating a vehicle care as a function of the at least a vehicle care parameter using the at least a vehicle care device; and at least a user authentication datum associated with the user;

wherein receiving the user input further comprises:

scanning, using a token reader, the at least a user authentication datum; and generating a token based on the at least a user authentication datum;

validating, by the control module, the vehicle care command as a function of the at least a user authentication datum based on the token using a validation module connected to a data store, wherein validating the vehicle care command comprises:

verifying the at least a vehicle care device identifier against a plurality of vehicle care device data stored in the data store; and verifying the token of the at least a user authentication datum against a plurality of user profiles stored in the data store;

generating, by the control module, a validation datum as a function of the validation of the vehicle care command, wherein generating the validation datum comprises:

identifying at least an edge device from the plurality of edge devices as a function of the verified vehicle care device identifier; and transmitting, by the control module, the validation datum to the at least an edge device of the plurality of edge devices; and activating, by the control module, the at least a vehicle care device as a function of the validation datum.

9. The method of claim 8, wherein the user input comprises a vehicle care execution datum.

10. The method of claim 8, wherein the at least a user authentication datum comprises a token containing a QR code.

11. The method of claim 8, wherein the at least a user authentication datum comprises membership data.

12. The method of claim 8, wherein the data store comprises a distributed data storage system configured to:

partition the plurality of vehicle care device data and the plurality of user profiles into a plurality of data shards; and store the plurality of data shards across the plurality of edge devices.

13. The method of claim 9, wherein validating the vehicle care command comprises validating the vehicle care command as a function of the vehicle care execution datum.

14. The method of claim 9, wherein generating the validation datum comprises:

executing a vehicle care execution protocol as a function of the validation of the vehicle care execution datum.

* * * * *